Figure 1:
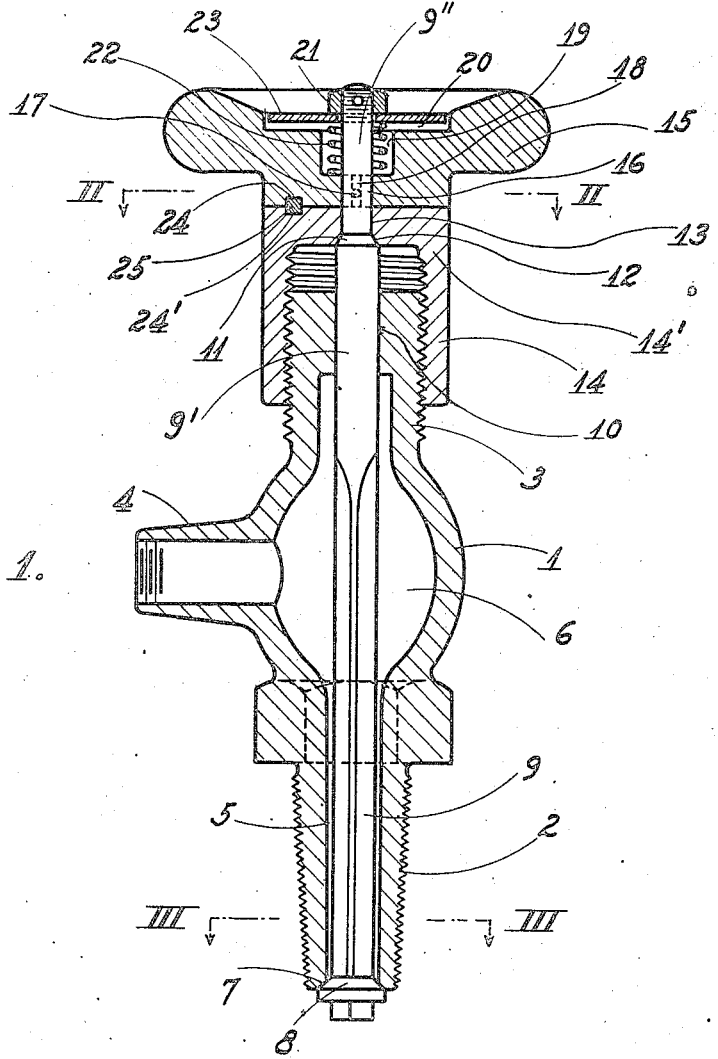

Jan. 22, 1924.

P. WERTZ

VALVE

Filed Oct. 5, 1922

1,481,576

WITNESSES
A.B. Wallace
C.R. Halbert

INVENTOR
Peter Wertz
BY
Coulter & Brown
ATTORNEYS

Patented Jan. 22, 1924.

1,481,576

UNITED STATES PATENT OFFICE.

PETER WERTZ, OF PITTSBURGH, PENNSYLVANIA.

VALVE.

Application filed October 5, 1922. Serial No. 592,518.

*To all whom it many concern:*

Be it known that I, PETER WERTZ, a citizen of the United States, and a resident of Pittsburgh, in the county of Allegheny and State of Pennsylvania, have invented a new and useful Improvement in Valves, of which the following is a specification.

This invention relates to valves and particularly to valves adapted to be used in connection with the boilers of locomotives as a blow-off valve, gage valve, or gage glass valve.

It has been found that many of the valves heretofore used as blow-off valves, or similar valves, are not constructed so as to prevent the escape of steam or water from the boiler in the event of rupture of the valve body or the actuating parts thereof. In case of wrecks a rupture of the valve casing within the locomotive cab frequently results in the escape of steam and water, scalding the engineer and other operatives therein.

It is an object of the invention to provide a device in which the valve head will be seated by the pressure within the boiler to prevent escape of steam therefrom in case the valve casing or the actuating means are disrupted or broken off.

Other objects are to provide a valve device in which the valve head is normally seated by the pressure of the fluid controlled which is provided with means for dislodging foreign matter to effect cleaning of the passage through the valve body, and in which a single actuating mechanism is employed to open the valve, to grind the valve head, and to lock the same to its seat.

It is a special object of the invention to provide an improved means for actuating a valve of this type in which the valve stem may be moved either longitudinally to vary the flow of fluid through the valve body or rotatably to grind the valve head upon its seat.

It is also a special object to provide a valve entirely void of the ordinary packing materials and glands yet one in which the escape of the fluid around the valve stem is effectively prevented.

Another special object is to provide an auxiliary face or shoulder upon the main valve stem to prevent the escape of fluid from the valve body, together with means to maintain the said auxiliary face firmly seated regardless of the longitudinal or rotative movement of the valve stem.

It is still a further special object of the invention to provide a valve actuating means in which a portion of the mechanism for moving the valve stem longitudinally may be employed to rotate the valve head to grind the same, which portion is firmly seated and supported for rotation upon the remaining portion.

These and other objects of the invention will more readily appear when taken in connection with the following description and the appended claims.

Figure 2:
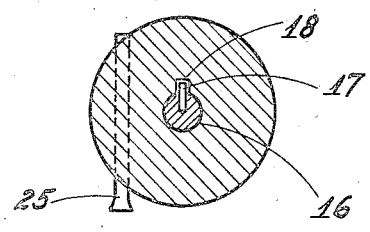
Figure 3:
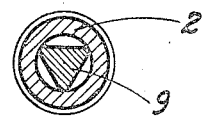

In the accompanying drawings Fig. 1 is a vertical section, with parts in elevation, taken through the valve actuating means and the main body or casing of the valve; Fig. 2 a transverse section taken on the line II—II of Fig. 1; and Fig. 3 a transverse sectional view taken on the line III—III of Fig. 1.

The valve comprises a body or casing 1 formed with the threaded inlet nipple 2 and the oppositely disposed actuating nipple 3, and provided with the usual threaded boss 4 to which the discharge pipe is adapted to be connected. The fluid passage 5 extends through the inlet nipple 2 into the central recess 6 of the body 1. A valve seat 7 is formed on the end of the nipple 2 with which the valve head 8 on the rod or stem 9 cooperates, said rod or stem extending through the passage 5, the body 1, and the nipple 3, projecting beyond the latter. The nipple 3 is provided with a longitudinal bore 10, the cross sectional dimension of which corresponds to that of the portion 9' of the valve stem so that the said portion snugly fits the bore 10. The bore 10 is of considerable length for the purpose of functioning as an effective sealing means to prevent the escape of fluid within the valve body outwardly around the portion 9'. The lower portion of the valve rod disposed within the passage 5 is substantially triangular in shape, as clearly shown in Fig. 3, so as to provide cleaning means and at the same time leave passages around the stem for the flow of the fluid therethrough.

The extreme upper portion 9" of the valve stem is of reduced cross section, the portion adjoining the enlarged and reduced sections 9', 9" forming an auxiliary face or shoulder 11 with which a seat 12 formed at the inner extremity of the central bore 13 of the inner lower section or part 14 of a composite actuating cap coacts, the reduced section 9″ of the main valve stem extending through the bore 13.

The composite actuating cap comprises two parts, the inner lower part 14, above mentioned, and an outer upper part 15, the inner part 14 being provided with an interiorly threaded depending skirt 14′ which cooperates with exterior threads formed upon the nipple 3. The outer part 15 is also provided with a central bore indicated at 16 which embraces the extremity 9″ of the valve stem, the outer part of the cap resting upon and being supported by the inner part 14 in the manner clearly shown in Fig. 1. The inner part of the cap is freely mounted upon the stem of the valve so as to permit relative rotative movement therebetween, while the outer part 15 is freely slidable longitudinally of the valve stem but is locked against relative rotative movement with respect thereto by means of a pin 17 anchored in the reduced section 9″, said pin extending into a longitudinal groove 18 formed at one side of the bore 16. The upper face of the part 15 is recessed, having bores of different diameters, the inner portion of the bore 19 being of smaller diameter than the outer portion 20 thereof. Fixed to the extreme outer end of the valve stem is an abutment in the form of a nut 21. A coiled spring 22 is disposed within the reduced bore 19, seating at one end upon the bottom of said bore and at its opposite end upon a disk 23 which fits within the enlarged bore 20, the disk being interposed between the end of the spring and the nut 21. The dimensions of these several parts are of such size as to normally leave a slight space between the disk 23 and the bottom of the enlarged bore 20, and to secure a comparatively snug fit of the disk within the said larger bore.

Formed in the contacting faces of the two parts of the actuating cap and at one side of the axis thereof are the grooves 24, 24′ respectively, the two grooves cooperating to form a rectangular opening through the cap. A pin 25 is adapted to fit within these grooves for the purpose of locking the parts of the cap for simultaneous rotative movement, it being obvious that upon removal of the pin 25 the outer part 15 of the cap may be rotated independently of the inner part 14, the upper surface of the inner part during such operation serving as an effective supporting and guiding surface for the outer part.

The operation of the device is as follows:

In order to open the main valve, the parts of the actuating cap are locked together by inserting the pin 25 within the cooperating grooves 24, 24′. With the parts in locked condition, rotation of the cap in the proper direction to move the skirt 14′ downwardly as viewed in Fig. 1, due to the abutment formed between the valve seat 12 and valve face 11, will force the head 8 away from its seat, and rotation in the opposite direction permits the pressure fluid acting upon the valve head 8 to force the same firmly to its seat. In order to facilitate turning of the cap, the outer part 15 is in the form of a handwheel. Should it be desirable to positively bind the head 8 upon its seat, the entire cap will be rotated until the bottom of the enlarged bore 20 contacts the disk 23, after which continued rotation will lift the valve stem upwardly due to the contact between the disk 23, the bottom of bore 20 and the nut 21, the spring 22 being compressed during such operation. Whenever it is desirable to merely rotate the valve stem without moving the same longitudinally in order to grind the valve head 8, the pin 25 is removed so as to permit free relative rotative movement between the parts 14, 15 of the cap. Rotation of the outer part 15 will then cause rotation of the valve stem due to the sliding connection formed between the pin 17 and the groove 18, effectively grinding the face of the main valve head.

The spring 22 constantly exerts an upward pull on the main valve stem and keeps the auxiliary face 11 seated at all times thus effectively preventing leakage of any fluid which might escape throughout the bore 10 around the section 9′ of the valve stem. The tension of the spring 22 also effectively serves as a means to constantly maintain the parts of the actuating cap in intimate contact. The upper end of the valve stem is maintained centered and is guided by the cooperation of the neat fit of the reduced section of the valve stem within the bores 13 and 16 together with the guiding effect due to the snug fitting of the disk 23 within the enlarged outer bore 20.

It is thus seen that the invention provides a very compact, sturdy, and simple construction in which the main valve is seated by the pressure of the fluid controlled, which can be easily cleaned without disassembly of the parts, which prevents escape of fluid in case the valve body and actuating means be torn away in a wreck, one in which the main valve head may be either adjusted with relation to its seat or rotated thereon for grinding the same, and one which is entirely void of the usual packing materials and glands to prevent leakage.

I claim:

1. A valve comprising a casing provided with a passage therethrough, a valve seat formed in said casing at one end of the passage, a rod having a head at one end cooperating with said seat and having its opposite end projecting through an opening in the casing, a pair of spaced abutments on the projecting end, a two-part cap mounted on the casing, one part being adapted to abut one of said abutments to move the said head from its seat, the other of said parts being operatively connected to the stem to rotate the same, and means for locking the said two parts for simultaneous rotative movement.

2. A valve comprising a casing provided with a passage therethrough, a valve seat formed in said casing at one end of the passage, a rod having a head at one end cooperating with said seat and having its opposite end projecting through an opening in the casing, a shoulder and an abutment on the projecting end of the stem, a two-part actuating cap fixed to the casing, one part being provided with a seat coacting with the said shoulder, the other of said parts being operatively connected to the stem to rotate the same, means for selectively locking or unlocking the said two parts for simultaneous rotative movement, the face of one of said parts serving as a support for the other during relative rotative movement therebetween.

3. A valve comprising a casing provided with a passage therethrough, a valve seat formed in said casing at one end of the passage, a rod having a head at one end cooperating with said seat and having its opposite end projecting through an opening in the casing, a shoulder and an abutment on the projecting end of the stem, a two-part actuating cap fixed to the casing, one part being provided with a seat coacting with the said shoulder, the other of said parts being operatively connected to the stem to rotate the same, means for selectively locking or unlocking the said two parts for simultaneous rotative movement, and means constantly urging the abutting faces of the said two parts into intimate contact and maintaining the shoulder and seat in abutting relation.

4. A valve comprising a casing provided with a passage therethrough, a valve seat formed in said casing at one end of the passage, a rod having a head at one end cooperating with said seat and having its opposite end projecting through an opening in the casing, a two-part cap having threaded engagement with the casing through which the rod projects, the inner part of the cap being rotatably mounted upon the rod, the upper part thereof being slidable but non-rotatable thereon, a shoulder forming an abutment on the rod disposed within the inner part of the cap, a seat on the said inner part coacting with the shoulder, an abutment on the extremity of the rod exteriorly of the outer part of the cap, a spring interposed between the last named abutment and the upper part of the cap for constantly retaining the parts of the cap in intimate contact and for urging the shoulder to its seat, and means for locking the two parts of the cap for simultaneous rotative movement.

5. A valve comprising a casing provided with a passage therethrough, a valve seat formed in said casing at one end of the passage, a rod having a head at one end cooperating with said seat, and having its opposite end projecting through an extended bore in the casing, a rod having a snug fit in said bore for forming a substantially tight seal, a two-part actuating cap having a threaded engagement with the casing through which the rod projects, the inner part of the cap being rotatably mounted upon the rod and the outer part thereof being slidable but non-rotatable thereon, a shoulder forming an abutment on the rod disposed within the inner part of the cap, a seat on the said inner part coacting with the shoulder, an abutment on the extremity of the rod exteriorly of the outer part of the cap, the exterior face of the outer part of the cap being provided with a recess having bores of different diameters, a disk fitting the outer enlarged bore interposed between the last-named abutment and the cap, a compression spring disposed within the inner smaller bore interposed between the said disk and cap, and means for locking the two parts of the cap to each other for simultaneous rotative movement.

In testimony whereof, I sign my name.

PETER WERTZ.

Witness:
EDWIN O. JOHNS.